United States Patent

[11] 3,620,468

[72] Inventor Joseph St. Amour
Acton, Mass.
[21] Appl. No. 878,349
[22] Filed Nov. 20, 1969
[45] Patented Nov. 16, 1971
[73] Assignee Digital Equipment Corporation
Maynard, Mass.

[54] TAPE TRANSPORT HUB
7 Claims, 3 Drawing Figs.

[52] U.S. Cl. .......... 242/68.3, 242/46.6
[51] Int. Cl. .......... B65h 75/02, B65h 75/24
[50] Field of Search .......... 242/68.3, 68.2, 68.1, 68.4, 72, 46.2, 46.21, 46.3, 46.6

[56] References Cited
UNITED STATES PATENTS
3,281,092 10/1966 Schultz et al. .......... 242/72
3,387,799 6/1968 Wilson .......... 242/72

*Primary Examiner*—George F. Mautz
*Assistant Examiner*—Milton Gerstein
*Attorney*—Cesari and McKenna

ABSTRACT: A hub for mounting a reel of magnetic tape on a tape transport is composed of a plurality of generally radially extending fingers distributed around the hub axis. Each finger is composed of a pair of flexible, resilient segments which are turned toward one another. The tape reel is in the form of an annulus which is placed on the hub so that the fingers engage the inner wall of the reel.
When the hub is rotated in one direction, the drag exerted by the reel on the fingers causes one segment in each finger to straighten out so that the tip of that segment tends to move further away from the hub axis into nonslip engagement with the reel. When the hub is rotated in the other direction, the other segment in each finger grips the reel in like manner. However, when the hub is stopped, the reel is easily slid onto and off the hub.

INVENTOR.
JOSEPH ST. AMOUR
BY
Blair Cesari & St. Onge
ATTORNEYS

TAPE TRANSPORT HUB

BACKGROUND OF THE INVENTION

This invention relates to a tape transport. It relates more particularly to a hub for supporting a reel of tape in a tape transport.

Tape transports are used in date processing systems to advance magnetic or paper tapes past read and write heads. The tapes are carried on reels which are rotated in one direction or the other by a capstan in the tape transport.

Conventionally, the reels are mounted on splined shafts which project through axial passages in the reels. Usually also a locking device is included at the end of the shaft to prevent the reel from accidentally sliding off the shaft. While these locking devices perform their function, they also make it more difficult to change tapes. That is, to change a tape, the shaft must be disengaged and the tape reel worked loose from the shaft. Then the new reel must be aligned properly, slid onto the shaft and locked. In some instances, this becomes a burdensome and time-consuming task.

SUMMARY OF THE INVENTION

Accordingly, it is an object of the present invention to provide an improved hub for mounting a tape reel in a tape transport.

Another object of the invention is to provide a tape transport hub which facilitates changing tapes.

Yet another object of the invention is to provide a self-locking hub for mounting tape reels.

Other objects will in part be obvious and will in part appear hereinafter.

The invention accordingly comprises the features of construction, combination of elements, and arrangement of parts which will be exemplified in the construction hereinafter set forth, and the scope of the invention will be indicated in the claims.

Briefly, the hub comprises a plurality of radially extending fingers which are arranged around the hub axis. Each finger is composed of a pair of flexible, resilient mirror image segments which are turned or bowed toward one another in the plane of the hub.

The tape reel used with the present hub is in the form of an annulus with an axial passage which is slightly smaller than the hub. When the hub is stationary, the reel can be slid easily onto the hub slightly bending the segments in each pair toward one another so the reel is held on the hub. Moreover, when the hub or reel is rotating in either direction, the finger segments extend and frictionally engage the wall of the axial passage so as to securely lock the reel on the hub.

More particularly, when the hub (or reel) is rotated in one direction, the frictional drag exerted by the reel on the hub fingers causes one segment of each finger to straighten out so that the segment moves away from the hub axis into nonslip engagement with the reel. When the hub (or reel) is rotated in the other direction, the other segment of each finger grips the reel in the same way. Thus, whenever the hub (or reel) is moving, the reel is securely locked to the hub. Yet, when the hub (or reel) is stationary, the reel can be placed on or taken from the hub without requiring special angular alignment with the hub or the lock. The resilient finger segments alone hold the reel on the hub. This allows easy loading and unloading of the reel, yet assures that the reel will not disengage from the hub when stationary.

BRIEF DESCRIPTION OF THE DRAWING

For a fuller understanding of the nature and objects of the invention, reference should be had to the following detailed description taken in connection with the accompanying drawing, in which.

DESCRIPTION OF THE PREFERRED EMBODIMENT

Figures 1, 2, 3:
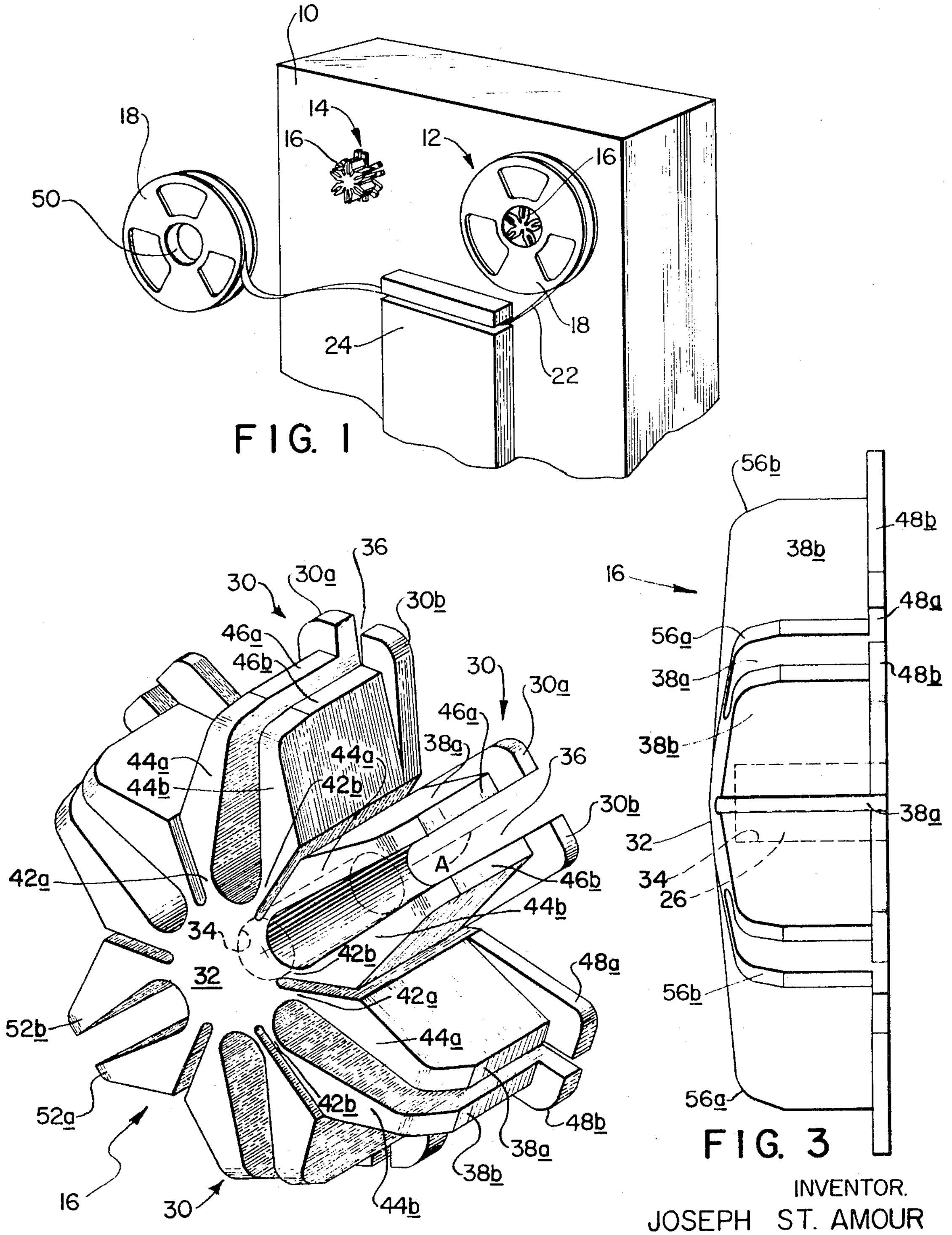
FIG. 1 is a fragmentary perspective view of a tape transport embodying the principles of this invention.
FIG. 2 is a perspective view on a larger scale showing the tape transport hub in greater detail.
FIG. 3 is a side elevational view of the hub.

Referring now to FIG. 1 of the drawing, the elements of the subject tape transport are mounted in a housing 10. The transport includes a takeup section indicated generally at 12 and a letoff section indicated generally at 14. Sections 12 and 14 each include a hub 16 and a tape reel 18 mounted on the hub. One reel 18 is shown removed from its hub 16 for illustrative purposes.

Reels 18 carry a length of magnetic tape 22 which is threaded through a protective enclosure 24 containing the usual capstan, read and write heads and the like. Hubs 16 are rotated in one direction or the other by means of rotary shafts 26 (FIG. 3) which constitute the hub 16 axles.

Turning now to FIG. 2, each hub 16 is made of rigid impact-resistant plastic or the like and comprises an array of bifurcated fingers shown generally at 30 which extend radially out from a central core 32 or more specifically the hub axis A. Core 32 has an axial passage 34 which receives the end of a shaft 26. In the illustrated embodiment, there are six fingers 30 distributed at equal angles about core 32, i.e. every 60°.

Each finger 30 is made up of two mirror image segments **30*a* and 30*b* which are separated by a relatively wide slit 36, and are bowed or turned toward one another. As best seen in FIGS. 2 and 3, each finger segment 30*a* has a vanelike section 38*a* which lies parallel to the hub axis. Section 38*a* is formed with a relatively thin neck 42*a* adjacent core 32 which extends radially out from axis A and provides a hingelike connection and a thicker, or enlarged, central portion 44*a* which is bent or bowed clockwise so that it makes an angle with neck 42*a*. Actually, portion 44*a* is generally tangent to the wall of passage 34. Portion 44*a* gradually tapers in the thickness direction so that its tip 46*a*** is relatively thin.

A flat flange **48*a* extending out to the side and beyond the tip 46*a* of portion 44*a* at the rear face of the hub acts as a stop for reel 18 as will be described in detail later. Finger segment 30*b* is a mirror image of segment 30*a* and includes all of the aforesaid parts. That is, it has vane portion 38*b* with an inner narrow radially extending neck 42*b* and a relatively thick portion 44*b* which tapers to a relatively narrow tip 46*b*. Portion 38*b* is bowed or bent counterclockwise so that it is generally tangent to passage 34 in core 32. Also, a flange 48*b* extends out to the side and beyond the tip 46*b* of portion 44*b***.

The finger segments **30*a* and 30*b* are relatively flexible and resilient. That is, when a force is applied to the segment tips 46*a*, 46*b* in the plane of the hub (i.e. clockwise or counterwise), the segments bend or deflect at their relatively thin necks 42*a*, 42*b***. When this force is removed, the segments return to their normal undeflected positions shown in FIG. 2.

Due to the bowed or bent shape of each finger segment **3*a*, 30*b*, when they are deflected in the foregoing manner, the distances between their tips 46*a*, 46*b*** and hub axis A change.

More particularly, when a segment **30*a* is deflected counterclockwise (FIG. 2), it tends to straighten out so that its tip 46*a* moves further away from axis A. In other words, the effective length of the segment 30*a* increases. The same elongation occurs to a segment 30*b* when it is deflected clockwise. On the other hand, when a segment 30*a* is deflected clockwise, the angle between its neck 42*a* and portion 44*a* tends to decrease so that its tip 46*a* draws closer to hub axis A. In the same manner, the effective length of a segment 30*b*** decreases where it is deflected counterclockwise (FIG. 2).

Referring again to FIG. 1, each reel 18 has a central axial passage 50 which is larger than those usually found in present-day tape reels. More particularly, the diameter of passage 50 is slightly less than the diameter of the hub as measured between the undeflected finger segment tips **46*a*, 46*b*** on the opposite sides of the hub axis A.

When mounting reel 18 on the hub, the reel is slid axially onto the fingers 30 so that the segment sections **38*a*, 38*b* extend into the reel passage 50. The front edges 56*a* and 56*b* of segment tips 46*a* and 46*b*, respectively, are beveled to facilitate mounting the reel and the flanges 48***a* and 48*b* on the fingers stop the reel so that it is properly positioned axially on the hub. The size of passage 50 is such that the finger segments of each pair are deflected toward one another so the tips 46*a* and 46*b* frictionally grip the passage 50 wall when the hub is stationary so that the reel will not disengage from the hub. Yet, the reel can be slid easily on and off the hub.

When hub 16 is rotated in one direction or the other, the reel and specifically the wall of passage 50 exerts a certain amount of frictional drag on the finger segment tips 46*a*, 46*b*. Thus, if the hub rotation is clockwise, the segments 30*a*, 30*b* are deflected counterclockwise. As pointed out above, this caused the effective length of segments 30*a* to increase so that tips 46*a* tightly engage the passage 50 wall. As a result, the reel 18 is locked firmly to the hub. The segments 38*b*, being effectively shortened, do not grip the reel.

On the other hand, when the hub is rotated counterclockwise, the segments 30*b* operate to grip the reel in the above manner, while the segments 30*a* are inactive.

Thus, each set of finger segments functions somewhat like the sprags in a one-way sprag clutch. That is, they flex to permit relative rotation between the hub and reel in one direction. but to lock the two together when the relative rotation is in the opposite direction. In this case, however, the clutching action of the two sets of finger segments complement one another so that the reel 18 is locked to hub 16 if there is any relative rotation between the hub and reel.

As soon as rotation of hub 16 ceases, the finger segments resume their original positions so that reel 18 can easily be slid off the hub for replacement. Of course, the hub 16 also operates in much the same way to lock the reel when the hub is freewheeling and the reel is rotated by a capstan advancing the tape.

Thus, the present tape reel hub positively locks the tape reel when it is rotated in either direction, yet permits the reel to be placed on and removed from the hub with a minimum amount of effort when the hub is stopped. Also the hub is simple to mold out of conventional rugged, long-lasting materials. Therefore, it is relatively inexpensive to make and requires essentially no maintenance.

The invention accordingly comprises the features of construction, combination of elements, and arrangement of parts which will be exemplified in the construction hereinafter set forth, and the scope of the invention will be indicated in the claims.

It is also to be understood that the following claims are intended to cover all of the generic and specific features of the invention herein described.

I claim:

1. A hub for mounting a reel comprising:

A. a central core for rotation about a shaft axis, and

B. at least one set of bifurcated fingers extending radially from said core, each finger having:

1. an outer surface adapted for engaging a reel, and
2. an inner portion hingedly connected to said core along a line parallel to the shaft axis, said inner portion and central core being integrally formed of a resilient material.

2. A hub as recited in claim 1 including an integral stop means disposed in an axial termination of said fingers.

3. A hub as recited in claim 1 wherein each of said fingers has a beveled portion at an axial termination of said outer surface.

4. A hub as recited in claim 1 wherein each of said fingers includes an enlarged central portion.

5. A tape drive system including:

A. a rotatable hub composed of a resilient material and comprising as integral portions thereof, 1. a central core for rotation about a shaft axis,
2. a plurality of equidistantly, circumferentially spaced sets of bifurcated fingers extending along and radially from said central core,
3. each of said fingers having an outer portion terminating in an outer surface and all said fingers defining a circle with a first diameter,
4. each of said fingers having an inner portion hingedly connecting to said core along a line parallel to said shaft axis, and B. an annular tape reel with a cylindrical mounting surface having a second diameter less than the first diameter, whereby mounting said reel causes said fingers to deflect and frictionally engage said reel-mounting surface subsequent relative motion in one direction causing corresponding ones of said fingers in each set to deflect outwardly about the hinge lines in each set to increase frictional engagement and produce a positive drive connection between said hub and said reel.

6. A system as recited in claim 5 wherein said hub fingers are beveled at one axial termination at said outer portion to facilitate reel loading, said hub additionally including an integral enlarged flange portion at the other axial termination to position said reel axially on said hub.

7. A system as recited in claim 6 wherein each of said fingers has a central portion of maximum thickness tapering to decreased thicknesses at the inner and outer portions thereof.

* * * * *